(12) United States Patent
Ishibashi (10) Patent No.: US 12,097,819 B2
(45) Date of Patent: Sep. 24, 2024

(54) CURTAIN AIRBAG MODULE

(71) Applicant: SUBARU CORPORATION, Tokyo (JP)

(72) Inventor: Kazushige Ishibashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/975,339

(22) Filed: Oct. 27, 2022

(65) Prior Publication Data

US 2023/0158995 A1 May 25, 2023

(30) Foreign Application Priority Data

Nov. 19, 2021 (JP) ................................. 2021-188302

(51) Int. Cl.
*B60R 21/232* (2011.01)
*B60R 21/213* (2011.01)

(52) U.S. Cl.
CPC .......... *B60R 21/232* (2013.01); *B60R 21/213* (2013.01)

(58) Field of Classification Search
CPC .............................. B60R 21/232; B60R 21/213
See application file for complete search history.

(56) References Cited

U.S. PATENT DOCUMENTS

| | | | | |
|---|---|---|---|---|
| 5,988,673 A * | 11/1999 | Stavermann | .......... | B60R 21/213 280/751 |
| 6,142,506 A * | 11/2000 | Patel | ..................... | B60R 13/025 296/187.05 |
| 6,234,517 B1 * | 5/2001 | Miyahara | ................ | B60R 21/04 280/751 |
| 6,293,581 B1 * | 9/2001 | Saita | ..................... | B60R 21/213 280/730.2 |
| 6,474,680 B1 * | 11/2002 | Miyahara | .............. | B60R 21/213 280/736 |
| 7,407,182 B2 * | 8/2008 | Aoki | ..................... | B60R 21/201 280/730.2 |
| 7,828,321 B2 * | 11/2010 | Bakhsh | ................. | B60R 21/232 280/730.2 |

(Continued)

FOREIGN PATENT DOCUMENTS

| | | | | |
|---|---|---|---|---|
| EP | 2112033 A1 * | 10/2009 | .......... | B60R 21/201 |
| JP | 2016-052824 A | 4/2016 | | |
| WO | WO-2011105080 A2 * | 9/2011 | .......... | B60R 21/213 |

*Primary Examiner* — Jason D Shanske
*Assistant Examiner* — Joselynn Y Sliteris
(74) *Attorney, Agent, or Firm* — MCGINN I.P. LAW GROUP, PLLC (57) ABSTRACT

A curtain airbag module that is to be attached at least to a side roof member of a vehicle body of a vehicle includes a curtain airbag, first tabs, and a coupler. The curtain airbag includes vehicle-body fixation points arranged in a longitudinal direction of the curtain airbag in a stored state extending in the longitudinal direction. The first tabs are to be attached to the vehicle body while being overlaid on the respective vehicle-body fixation points. The coupler couples some first tabs adjacent to each other that are a portion or all of the first tabs. The coupler is provided along an extending direction of the curtain airbag. The coupler has a shape with no portion to be present between the curtain airbag and the vehicle body in a state where the first tabs are attached to the vehicle body.

20 Claims, 7 Drawing Sheets

(56) References Cited

U.S. PATENT DOCUMENTS

| | | | | |
|---|---|---|---|---|
| 7,874,579 B2* | 1/2011 | Yokota | ............. | B60R 21/232 |
| | | | | 280/730.2 |
| 8,408,586 B2* | 4/2013 | Ohmori | ............. | B60R 21/237 |
| | | | | 280/730.2 |
| 8,641,087 B2* | 2/2014 | Saiki | ............. | B60R 21/2346 |
| | | | | 280/730.2 |
| 8,727,371 B2* | 5/2014 | Ochiai | ............. | B60R 21/2176 |
| | | | | 280/730.2 |
| 9,333,935 B2* | 5/2016 | Kim | ............. | B60R 21/2334 |
| 9,630,585 B2* | 4/2017 | Tsumura | ............. | B60R 21/201 |
| 10,864,879 B2* | 12/2020 | Jinnai | ............. | B60R 21/232 |
| 11,548,465 B2* | 1/2023 | Tilli | ............. | B60R 21/213 |
| 11,833,991 B2* | 12/2023 | Kim | ............. | B60R 21/232 |

* cited by examiner

[MODIFICATION]

FIG. 11

[MODIFICATION]

CURTAIN AIRBAG MODULE

CROSS-REFERENCE TO RELATED APPLICATIONS

The present application claims priority from Japanese Patent Application No. 2021-188302 filed on Nov. 19, 2021, the entire contents of which are hereby incorporated by reference.

BACKGROUND

The disclosure relates to a curtain airbag module.

A vehicle such as an automobile uses, for example, a curtain airbag for occupant protection. For example, reference is made to Japanese Unexamined Patent Application Publication (JP-A) No. 2016-052824. The curtain airbag is attached, for example, to a side roof rail of a vehicle body. The curtain airbag is stored, extending in a longitudinal direction along the side roof rail. Upon an emergency, the curtain airbag is deployed downward from the side roof rail by a high-pressure gas generated by an inflator. This makes it possible to prevent an occupant present inside a vehicle from coming into direct contact with a side surface of the vehicle body.

SUMMARY

An aspect of the disclosure provides a curtain airbag module to be attached at least to a side roof member of a vehicle body of a vehicle. The curtain airbag module includes a curtain airbag, first tabs, and a coupler. The curtain airbag includes vehicle-body fixation points that are arranged in a longitudinal direction of the curtain airbag in a stored state extending in the longitudinal direction. The first tabs are to be attached to the vehicle body while being overlaid on the respective vehicle-body fixation points of the curtain airbag. The coupler couples some first tabs adjacent to each other. The some first tabs are a portion or all of the first tabs. The coupler is provided along an extending direction of the curtain airbag extending in the longitudinal direction. The coupler has a shape with no portion to be present between the curtain airbag and the vehicle body in a state where the first tabs are attached to the vehicle body.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A curtain airbag to be attached to a vehicle body at a part such as a side roof rail entirely covers an upper portion of a side surface of a vehicle compartment. The curtain airbag in a stored state may extend in a longitudinal direction that is a front-rear direction of the vehicle body. For example, the curtain airbag attached to the vehicle body may have a length almost the same as that of the side roof rail.

For such a reason, the curtain airbag extending in the longitudinal direction may be provided with vehicle-body fixation points, and the curtain airbag extending in the longitudinal direction may be attached to a part such as the side roof rail of the vehicle body at the vehicle-body fixation points, for example, by means of clips.

The curtain airbag extending in the longitudinal direction may include, however, a rolled-up or folded base cloth, and may be easily twisted. Accordingly, when a person in charge attaches the curtain airbag extending in the longitudinal direction to a part such as the side roof rail of the vehicle body, the person in charge can attach the curtain airbag to the vehicle body in a twisted state. This may make, upon attaching the curtain airbag to the vehicle body, the person in charge attach the vehicle-body fixation points to a part such as the side roof rail of the vehicle body while checking that the curtain airbag is not twisted.

It may be desired to achieve easier attachment, to a vehicle, of a curtain airbag that is to be stored, extending in a longitudinal direction.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
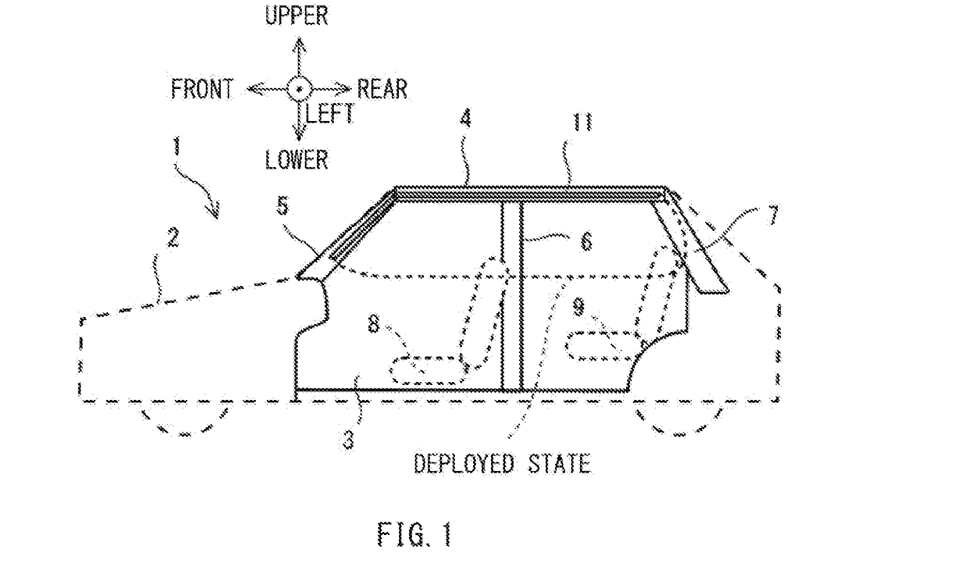
FIG. 1 is an explanatory diagram schematically illustrating a structure of a vehicle according to one example embodiment of the disclosure.

FIG. 1 is an explanatory diagram schematically illustrating a structure of a vehicle 1 according to an example embodiment of the disclosure.

FIG. 1 mainly illustrates a right-side structure of a vehicle compartment 3 of the vehicle 1.

The vehicle 1 illustrated in FIG. 1 may be, for example but not limited to, an automobile. A vehicle body 2 of the vehicle 1 may be provided with the vehicle compartment 3 in which an occupant is to be present. The vehicle compartment 3 may be provided with a front seat 8 and a back seat 9 on each which an occupant is to sit. At a side surface of a ceiling of the vehicle compartment 3 of the vehicle body 2, a side roof rail 4 may extend in a longitudinal direction that is a front-rear direction. Coupled to a front end of the side roof rail 4 may be an A-pillar 5. Coupled to the middle of the side roof rail 4 may be a B-pillar 6. Coupled to a rear end of the side roof rail 4 may be a C-pillar 7. The side roof rail 4, the A-pillar 5, the B-pillar 6, and the C-pillar 7 may each be a roof side member of the vehicle compartment 3.

For occupant protection, the vehicle 1 described above may be provided with airbags including a curtain airbag 11 illustrated in FIG. 1.

The curtain airbag 11 illustrated in FIG. 1 may be stored in a region from the A-pillar 5 to the side roof rail 4, extending in the longitudinal direction that is the front-rear direction. Unlike other airbags including a front airbag that deploys in front of an occupant, the curtain airbag 11 may be stored in a long and narrow limited space such as the side roof rail 4.

In a case where a control system of the vehicle 1 detects or predicts contact, an inflator 51 may be ignited and the curtain airbag 11 may be deployed thereby. For example, the curtain airbag 11 may deploy downward from the side roof rail 4. The curtain airbag 11 illustrated in FIG. 1 may deploy to a height below respective upper ends of the front seat 8 and the back seat 9 provided in the vehicle compartment 3. The curtain airbag 11 may deploy in a region from the A-pillar 5 to the C-pillar 7, having a great width in the front-rear direction corresponding to a width of the vehicle compartment 3 in the front-rear direction.

Such deployment of the curtain airbag 11 helps to prevent an occupant body from coming into direct contact with a side surface of the vehicle body 2 even if the occupant present in the vehicle compartment 3 inclines to an outer side in a vehicle width direction, for example, to a right side. It is thus possible to protect the occupant.

The above-described curtain airbag 11 may entirely cover an upper portion of a side surface of the vehicle compartment 3 as described above. The curtain airbag 11 in a stored state may extend in the longitudinal direction that is the front-rear direction of the vehicle body 2. For example, the curtain airbag 11 attached to the vehicle body 2 may have a length almost the same as that of the side roof rail 4.

For such a reason, the curtain airbag 11 extending in the longitudinal direction may be provided with vehicle-body fixation members 13, as will be described later. The curtain airbag 11 extending in the longitudinal direction may be attached to a part such as the side roof rail 4 of the vehicle body 2 at the vehicle-body fixation members 13, for example, by means of clips 60.

The curtain airbag 11 extending in the longitudinal direction may include, however, a rolled-up or folded base cloth 12, and may be easily twisted. Accordingly, when a person in charge attaches the curtain airbag 11 extending in the longitudinal direction to a part such as the side roof rail 4 of the vehicle body 2, the person in charge can attach the curtain airbag 11 to the vehicle body 2 in a twisted state. This may make, upon attaching the curtain airbag 11 to the vehicle body 2, the person in charge attach the vehicle-body fixation members 13 to a part such as the side roof rail 4 of the vehicle body 2 while checking that the curtain airbag 11 extending in the longitudinal direction is not twisted. While attaching the vehicle-body fixation members 13 one by one in order to a part such as the side roof rail 4 of the vehicle body 2, the person in charge may continuously check that the curtain airbag 11 is not twisted.

Thus, it may be desired to achieve easier attachment, to the vehicle 1, of the curtain airbag 11 that extends in the longitudinal direction in the stored state.

To address this, the example embodiment may use a curtain airbag module 10 that is attachable to the vehicle body 2.

Figure 2:
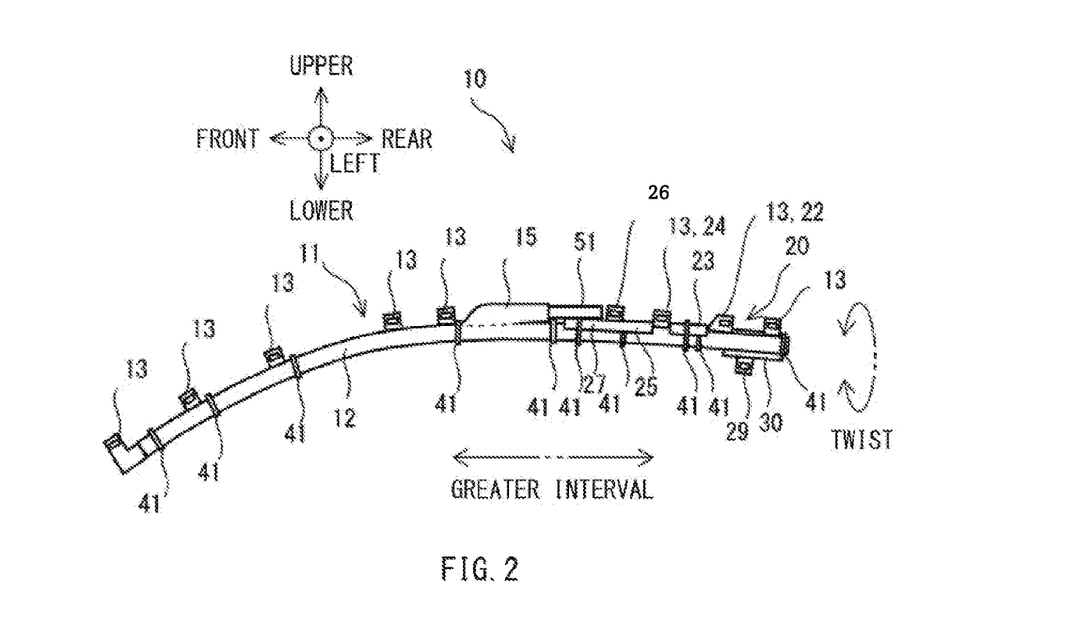
FIG. 2 is a diagram illustrating an appearance of a curtain airbag module to be used for the vehicle illustrated in FIG. 1.

FIG. 2 is a diagram illustrating an appearance of the curtain airbag module 10 to be used for the vehicle 1 illustrated in FIG. 1.

In FIG. 2, the front-rear direction of the vehicle 1 illustrated in FIG. 1 is indicated. The front-rear direction of the vehicle 1 is also similarly illustrated in other drawings.

The curtain airbag module 10 illustrated in FIG. 2 may include the curtain airbag 11, a rear-end bracket 20, and the inflator 51.

For example, as with the curtain airbag 11 illustrated in FIG. 1, the curtain airbag module 10 may be attached to a range from the A-pillar 5 to a rear end of the side roof rail 4 of the vehicle body 2 of the vehicle 1. The curtain airbag module 10 may be attached to the vehicle body 2, extending in the longitudinal direction that is the front-rear direction of the vehicle body 2.

As long as the curtain airbag 11 is able to deploy to be present between a side portion of the vehicle body 2 and an occupant body, a range to attach the curtain airbag module 10 is not limited to the range illustrated in FIG. 1. In one example, the curtain airbag module 10 may be attached to any other roof side member such as the C-pillar 7 or the B-pillar 6.

Figure 3:
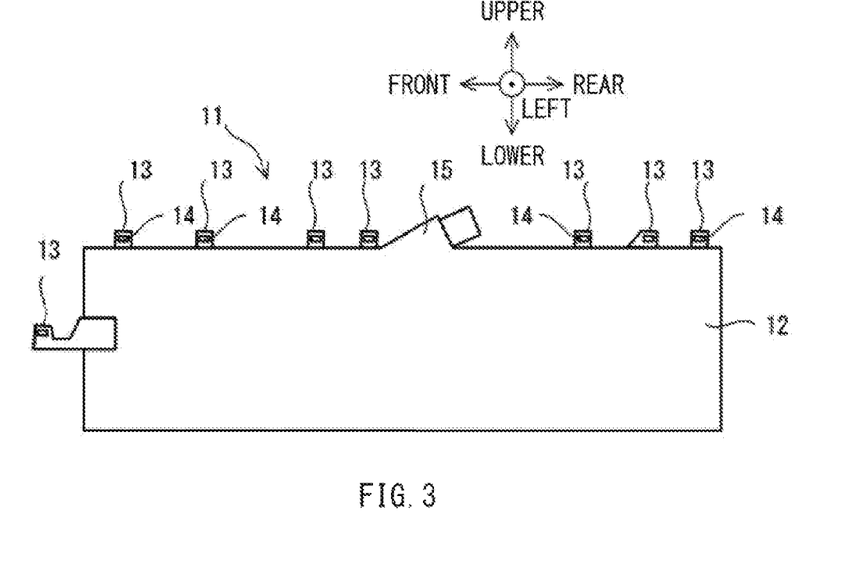
FIG. 3 is an explanatory diagram for describing an airbag illustrated in FIG. 2.

FIG. 3 is an explanatory diagram for describing the curtain airbag 11 illustrated in FIG. 2.

The curtain airbag 11 illustrated in FIG. 3 may include the base cloth 12 and the vehicle-body fixation members 13. The base cloth 12 may have a bag shape and may be deployed in a substantially quadrangular shape by a high-pressure gas generated by the inflator 51. The vehicle-body fixation members 13 may be provided at a front edge and an upper edge of the base cloth 12 having the substantially quadrangular shape. Each of the vehicle-body fixation members 13 may have a bag hole 14 into which the clip 60 is insertable, as will be described later.

In one example, the base cloth 12 having the substantially quadrangular shape may be rolled upward from a lower edge illustrated in FIG. 3 to be stored, extending in the longitudinal direction that is the front-rear direction. In another example, the base cloth 12 having the substantially quadrangular shape may be folded in a zigzag manner upward from the lower edge illustrated in FIG. 3 to be stored, extending in the longitudinal direction that is the front-rear direction.

Provided in the middle of the upper edge of the base cloth 12 having the substantially quadrangular shape may be a gas introducer 15. The gas introducer 15 may be coupled to the inflator 51.

The gas introducer 15 may receive the inflator 51 inserted therein. As illustrated in FIG. 2, the inflator 51 may be provided along a longitudinal direction of the base cloth 12 of the curtain airbag 11 in the middle of the upper edge of the base cloth 12 of the curtain airbag 11 that is in the stored state, extending in the longitudinal direction that is the front-rear direction.

On the upper side of the base cloth 12 of the curtain airbag 11 in the stored state extending in the longitudinal direction, the vehicle-body fixation members 13 may be arranged in the longitudinal direction, i.e., the front-rear direction. For example, the vehicle-body fixation members 13 may be arranged at predetermined intervals.

However, the inflator 51 may be provided in the middle on the upper side of the base cloth 12 of the curtain airbag 11. It may be difficult to provide the vehicle-body fixation member 13 near the inflator 51. For example, in a case illustrated in FIG. 2, an interval between the vehicle-body fixation member 13 immediately on the front side of the inflator 51 and the vehicle-body fixation member 13 immediately on the rear side of the inflator 51 may be greater than intervals at other positions, as indicated by a dashed-two-dotted straight line with arrows on both ends.

As with the case describing the curtain airbag 11 in reference to FIG. 1, for example, the curtain airbag module 10 may be stored extending in the longitudinal direction that is the front-rear direction, and may be attached to the vehicle body 2 along the side roof rail 4.

The curtain airbag 11 may often include, for example, a cloth or a rubber material as a base material. Therefore, if nothing is done for the curtain airbag module 10, the curtain airbag module 10 can also be twisted as indicated by a dashed-two-dotted circular line with arrows on both ends in FIG. 2. In this case, when a person in charge attaches the curtain airbag module 10 to the vehicle body 2, the person in charge may attach the vehicle-body fixation members 13 to a part such as the side roof rail 4 of the vehicle body 2 while checking that the curtain airbag module 10 extending in the longitudinal direction is not twisted. While attaching the vehicle-body fixation members 13 one by one in order to a part such as the side roof rail 4 of the vehicle body 2, the person in charge may continuously check that the curtain airbag 11 is not twisted.

Figure 4:
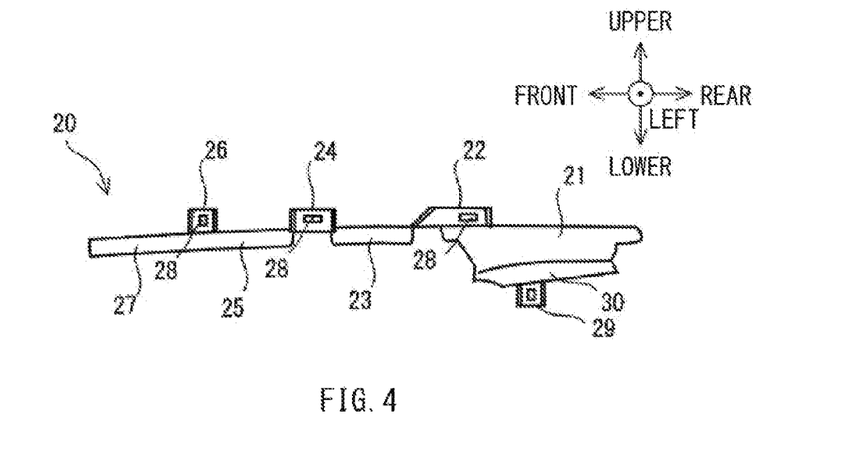
FIG. 4 is an explanatory diagram for describing a rear-end bracket illustrated in FIG. 2.

FIG. 4 is an explanatory diagram for describing the rear-end bracket 20 illustrated in FIG. 2.

The rear-end bracket 20 illustrated in FIG. 4 may be provided at a rear portion of the curtain airbag module 10 extending in the longitudinal direction that is the front-rear direction, as illustrated in FIG. 2.

The rear-end bracket 20 may include a base 21, a second fixation tab 22, a coupler 23, a first fixation tab 24, a rear extending part 25, a free tab 26, and a front extending part 27.

The base 21 of the rear-end bracket 20 may have a substantially quadrangular plate shape that is long in the front-rear direction. A lower edge of the base 21 having the substantially quadrangular shape may be provided with a base tab 29. An upper edge of the base 21 having the substantially quadrangular shape may be provided with the second fixation tab 22. The base 21 having the substantially quadrangular shape may be fixed at its top and bottom to the vehicle body 2. It is thus possible to firmly fix the rear-end bracket 20 to the vehicle body 2 so that the rear-end bracket 20 hardly moves and changes its attitude with respect to the vehicle body 2 also upon the deployment of the curtain airbag 11. A lower portion of the base 21 having the substantially quadrangular shape may be provided with a jump ramp 30. The jump ramp 30 may have a shape protruding toward the inner side of the vehicle compartment 3. The curtain airbag 11 deploying downward may come into contact with the jump ramp 30. This allows the curtain airbag 11 to deploy downward without hitting an upper portion of the C-pillar 7, as will be described later.

The second fixation tab 22 may be provided on the front side of the base 21 having the substantially quadrangular shape. The second fixation tab 22 may have a substantially plate shape. The second fixation tab 22 having the substantially plate shape may be coupled to the base 21 to protrude upward from a front portion of the upper edge of the base 21 having the substantially quadrangular shape.

The second fixation tab 22 having the substantially plate shape may have a bracket hole 28 into which the clip 60 is insertable.

The coupler 23 may be provided on the front side of the second fixation tab 22 having the substantially plate shape. The coupler 23 may have a plate shape that is curved in a left-right direction of the vehicle body 2, i.e., an inner-outer direction of the vehicle body 2. The coupler 23 having the curved plate shape may be coupled at its rear end to a front edge of the second fixation tab 22 having the substantially plate shape, being spaced away from the base 21. The coupler 23 and the second fixation tab 22 may be coupled to each other not substantially on a line but substantially at a point.

The first fixation tab 24 may be provided on the front side of the coupler 23 having the curved plate shape. The first fixation tab 24 may have a substantially plate shape. The first fixation tab 24 having the substantially plate shape may be coupled to a front edge of the coupler 23 to protrude upward from the coupler 23 having the curved plate shape. The first fixation tab 24 and the coupler 23 may be coupled to each other substantially at a point.

The first fixation tab 24 having the substantially plate shape may have a bracket hole 28 into which the clip 60 is insertable.

The rear extending part 25 may be provided on the front side of the first fixation tab 24 having the substantially plate shape. The rear extending part 25 may have a plate shape that is curved in the left-right direction of the vehicle body 2, i.e., the inner-outer direction of the vehicle body 2. The rear extending part 25 having the curved plate shape may be coupled at its rear end to a front edge of the first fixation tab 24 having the substantially plate shape, being spaced away from the coupler 23.

The free tab 26 may be provided on the front side of the rear extending part 25 having the curved plate shape. The free tab 26 may have a substantially plate shape. The free tab 26 having the substantially plate shape may be coupled to the rear extending part 25 to protrude upward from the rear extending part 25 having the curved plate shape. The free tab 26 and the rear extending part 25 may be coupled to each other substantially at a point.

The free tab 26 having the substantially plate shape may have a bracket hole 28 into which the clip 60 is insertable.

The front extending part 27 may be provided on the front side of the free tab 26 having the substantially plate shape. The front extending part 27 may have a plate shape that is curved in the left-right direction of the vehicle body 2, i.e., the inner-outer direction of the vehicle body 2. The front extending part 27 and the rear extending part 25 may be directly coupled to each other, forming a single extending part having a curved plate shape.

The rear-end bracket 20 having the complicated shape described above may be formed using a resin material, for example, by resin molding using a mold. For example, each portion of the rear-end bracket 20 may be flexible.

In the rear-end bracket 20 illustrated in FIG. 2, the base 21, the second fixation tab 22, the coupler 23, the first fixation tab 24, the rear extending part 25, the free tab 26, and the front extending part 27 may be arranged in order along an extending direction of the curtain airbag 11 extending in the longitudinal direction, i.e., in the front-rear direction.

The front extending part 27 having the curved plate shape and the rear extending part 25 may be arranged substantially in a line, and may be molded as a single curved plate member. The coupler 23 having the curved plate shape may be included in a single curved plate member including the front extending part 27 and the rear extending part 25. The coupler 23 having the curved plate shape may be provided along an extending direction of an upper surface of the curtain airbag 11 in the stored state extending in the longitudinal direction and may be curved along the upper surface of the curtain airbag 11 in the stored state.

The free tab 26, the first fixation tab 24, and the second fixation tab 22, which are tabs provided to the rear-end bracket 20, may be arranged along the front-rear direction, protruding upward from an outer edge of the single curved plate member.

In one embodiment, the second fixation tab 22 and the first fixation tab 24 may serve as "first tabs". The second fixation tab 22 and the first fixation tab 24 may be coupled to each other by the coupler 23. In one embodiment, the second fixation tab 22 and the first fixation tab 24 may serve as "first tabs adjacent to each other".

In one embodiment, the free tab 26 may serve as a "second tab". The first fixation tab 24 and the free tab 26 as tabs adjacent to each other may be coupled to each other by the rear extending part 25.

The free tab 26, which is the first one positioned on the front side among the tabs coupled to each other in the rear-end bracket 20, may be provided with the front extending part 27 in such a manner that the front extending part 27 protrudes further to the front side of the free tab 26.

As illustrated in FIG. 2, the rear-end bracket 20 described above may be fixed to the base cloth 12 of the curtain airbag 11 in the stored state extending in the longitudinal direction by means of a sealing tape 41. The sealing tape 41 may be breakable upon the deployment of the curtain airbag 11.

The front extending part 27 provided at a front end of the rear-end bracket 20 may be fixed to the base cloth 12 of the curtain airbag 11 in the stored state extending in the longitudinal direction in such a manner that the front extending part 27 is interposed between the base cloth 12 of the curtain airbag 11 and the inflator 51.

Figure 5:
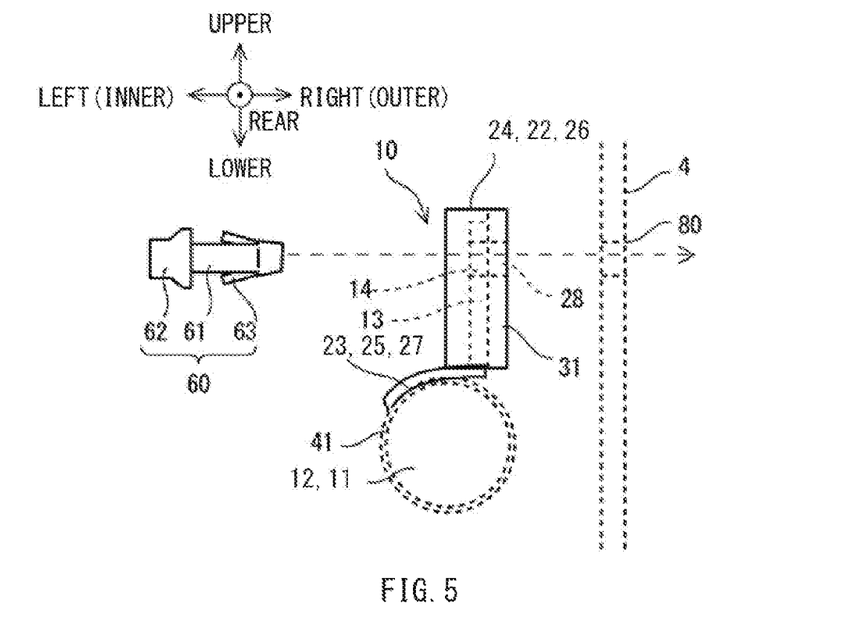
FIG. 5 is a diagram for describing a method of attaching the rear-end bracket to a vehicle body, taking a first fixation tab for example.

FIG. 5 is a diagram for describing a method of attaching the rear-end bracket 20 to the vehicle body 2, taking the first fixation tab 24 for example.

FIG. 5 illustrates, together with the first fixation tab 24 and the coupler 23 of the rear-end bracket 20, the clip 60, the vehicle-body fixation member 13 of the curtain airbag 11 in the stored state extending in the longitudinal direction, and the side roof rail 4 of the vehicle body 2. The base cloth 12 of the curtain airbag 11 may be rolled up and stored on the lower side of the coupler 23 having the curved plate shape. The vehicle-body fixation member 13 of the curtain airbag 11 may be overlaid on the first fixation tab 24 in such a manner that the bag hole 14 of the vehicle-body fixation member 13 is aligned with the bracket hole 28 of the first fixation tab 24.

The side roof rail 4 of the vehicle body 2 may have a fixation hole 80 which the clip 60 is to be inserted into and fixed at.

The clip 60 may include a shaft 61, a knob 62, and backward projections 63. The shaft 61 may have a substantially columnar outer shape. The knob 62 may be provided at a first end of the shaft 61 and have a width greater than that of the shaft 61. The backward projections 63 may be opened from a second end toward the first end of the shaft 61. The clip 60 may include a resin material. The backward projections 63 may be deformed toward the shaft 61.

For example, a person in charge may align the bag hole 14 of the vehicle-body fixation member 13 of the curtain airbag 11, the bracket hole 28 of the first fixation tab 24, and the fixation hole 80 of the side roof rail 4 with each other. The person in charge may insert the clip 60 into the bag hole 14 and the bracket hole 28 that are aligned with each other. The clip 60 may be inserted into the bag hole 14 and the bracket hole 28 with the backward projections 63 being bent. Finally, the backward projections 63 may be opened as in their original states on the inner side of the side roof rail 4.

The clip 60 may thus fix the first fixation tab 24 to the side roof rail 4 of the vehicle body 2 together with the vehicle-body fixation member 13 of the curtain airbag 11.

Similarly, the second fixation tab 22 may also be fixed by the clip 60 to the side roof rail 4 of the vehicle body 2 together with the vehicle-body fixation member 13 of the curtain airbag 11.

The free tab 26 may be fixed by the clip 60 to the side roof rail 4 of the vehicle body 2 alone without being overlaid on the vehicle-body fixation member 13 of the curtain airbag 11.

As illustrated in FIG. 5, the coupler 23 having the curved plate shape may be coupled to a lower end of the first fixation tab 24 at an outer edge in a state where the first fixation tab 24 is attached to the vehicle body 2. The outer edge may be positioned on the outer side of the vehicle body 2. Therefore, in the state where the first fixation tab 24 is attached to the vehicle body 2, the coupler 23 having the curved plate shape may stand with respect to a contact surface 31 of the first fixation tab 24. The contact surface 31 of the first fixation tab 24 may be in contact with the vehicle body 2 where the first fixation tab 24 is attached to the vehicle body 2.

Similarly, the front extending part 27 and the rear extending part 25 may also stand with respect to the contact surface 31 of the tabs.

Figure 6:
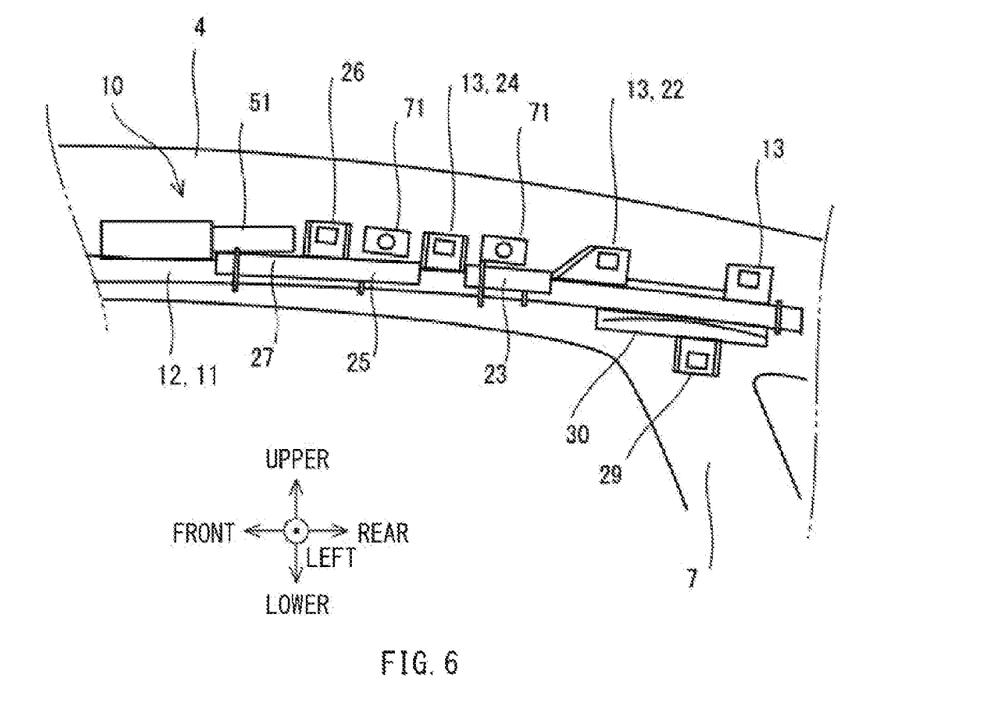
FIG. 6 is an explanatory diagram for describing a state in which the rear-end bracket and its peripheries are attached to the vehicle body.

FIG. 6 is an explanatory diagram for describing a state in which the rear-end bracket 20 and its peripheries are attached to the vehicle body 2.

Figure 7:
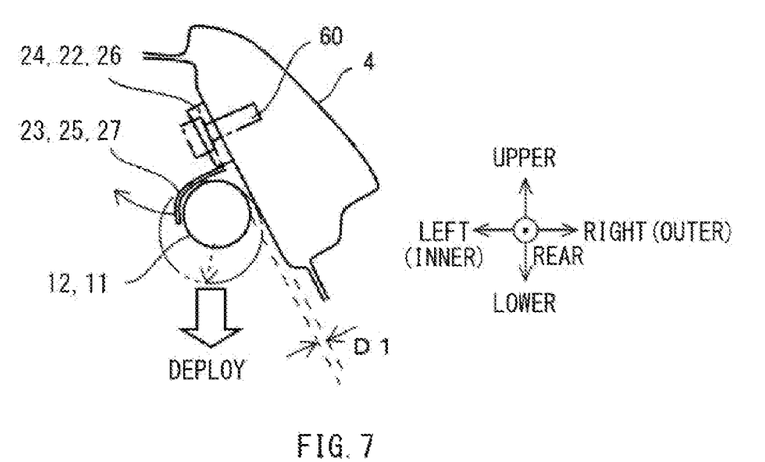
FIG. 7 is a vertical sectional view of the vicinity of the first fixation tab related to the attachment state illustrated in FIG. 6.

FIG. 7 is a vertical sectional view of the vicinity of the first fixation tab 24 related to the attachment state illustrated in FIG. 6.

As illustrated in FIG. 6, the curtain airbag module 10 may be attached to the side roof rail 4 of the vehicle body 2 by the second fixation tab 22, the first fixation tab 24, the free tab 26, and the base tab 29 of the rear-end bracket 20. The base 21 of the rear-end bracket 20 may be positioned on the upper side of the C-pillar 7. The rear-end bracket 20 as a whole may be fixed to the side roof rail 4 in a range from a position on the upper side of the C-pillar 7 to a position on the upper side of the B-pillar 6.

A pair of pedestals 71 of an assist grip may be provided on the front side and the rear side of the first fixation tab 24. The rear extending part 25 may be positioned on the lower side of the pedestal 71 that is provided on the front side. The coupler 23 may be positioned on the lower side of the pedestal 71 that is provided on the rear side. Thus, multiple members may be densely attached to the side roof rail 4 of the vehicle 1.

In a state where the members including the first fixation tab 24 are attached to the vehicle body 2, the coupler 23 having the curved plate shape may extend along the longitudinal direction of the curtain airbag 11 in the stored state extending in the longitudinal direction, as illustrated in FIG. 6.

In addition, the coupler 23 having the curved plate shape may be provided not to be present between the vehicle body 2 and the base cloth 12 of the curtain airbag 11 in the stored state extending in the longitudinal direction, as illustrated in FIG. 7.

Figure 8:
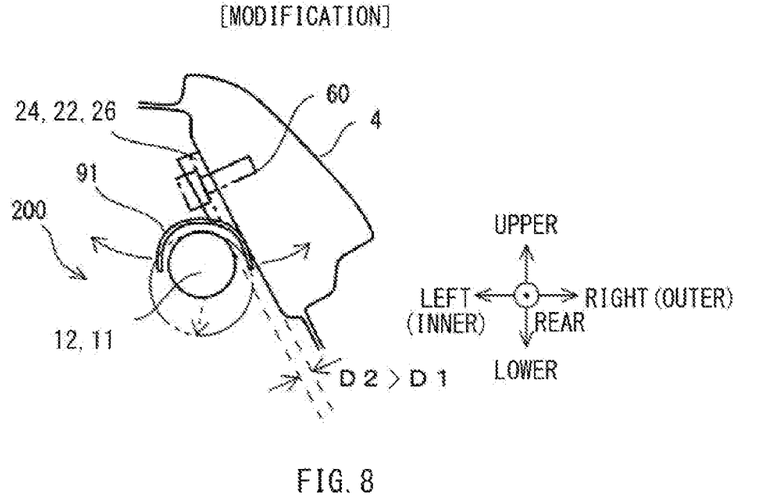
FIG. 8 is a vertical sectional view of a rear-end bracket according to a modification which is to be compared with FIG. 7.

FIG. 8 is a vertical sectional view of a rear-end bracket 200 according to a modification which is to be compared with FIG. 7.

The rear-end bracket 200 according to the modification illustrated in FIG. 8 may include a coupler 91 having a curved plate shape with a substantially U-shaped section. Other members provided to the rear-end bracket 200 having the plate shape, including a front extending part and a rear extending part may each have a curved plate shape with a substantially U-shaped section as well.

The member such as the coupler 91 that is provided on the upper side of the curtain airbag 11 along the upper surface of the curtain airbag 11 may have the substantially U-shaped section. In this case, the coupler 91 having the substantially U-shaped section may have a portion that is present between the vehicle body 2 and the base cloth 12 of the curtain airbag 11 in the stored state extending in the longitudinal direction.

A distance D2 from an inner surface of the side roof rail 4 to the base cloth 12 of the curtain airbag 11 in the modification illustrated in FIG. 8 may be greater than a distance D1 from the inner surface of the side roof rail 4 to the base cloth 12 of the curtain airbag 11 in the example embodiment illustrated in FIG. 7.

As a result, a portion of the side roof rail 4 that protrudes to the inner side toward a head of an occupant may be greater.

Referring to FIG. 7 again, the base cloth 12 of the curtain airbag 11 in the stored state extending in the longitudinal direction may start to be inflated by the high-pressure gas generated by the inflator 51 and deploy downward. In this case, the base cloth 12 of the curtain airbag 11 may inflate as indicated by a dashed-two-dotted line circle in FIG. 7, and push upward the coupler 23 having the curved plate shape. The base cloth 12 of the inflating curtain airbag 11 may also push upward the front extending part 27 and the rear extending part 25 each having the curved plate shape.

Figure 9:
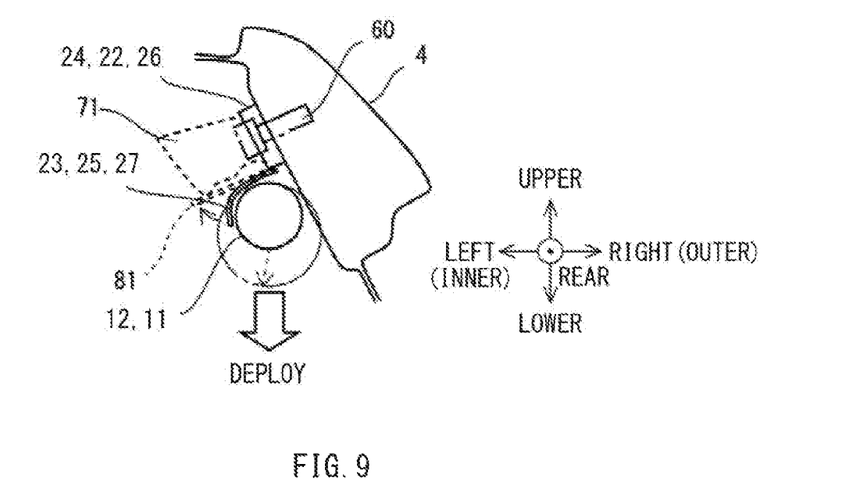
FIG. 9 is a diagram for describing a movement of a coupler of the rear-end bracket upon deployment of the curtain airbag.

FIG. 9 is a diagram for describing a movement of the coupler 23 of the rear-end bracket 20 upon the deployment of the curtain airbag 11.

The coupler 23 having the curved plate shape may be pushed upward by the inflating curtain airbag 11, and thereby be deformed upward as indicated by an arrow in FIG. 9.

However, the pedestal 71 of the assist grip may be provided on the upper side of the coupler 23 having the curved plate shape.

Accordingly, the coupler 23 having the curved plate shape may be deformed upward until the coupler 23 comes into contact with the pedestal 71 of the assist grip.

The front extending part 27 and the rear extending part 25 each having the curved plate shape may also similarly be deformed upward.

For the above-described reason, the coupler 23 having the curved plate shape may have a width that is greater than or equal to a width of the pedestal 71 of the assist grip in the left-right direction, i.e., in the inner-outer direction, for example.

The coupler 23 having the curved plate shape and the width greater than that of the pedestal 71 in the left-right direction, i.e., in the inner-outer direction, may be able to cover the pedestal 71.

This helps to prevent the curtain airbag 11, which starts to deploy and inflate, from coming into direct contact with the pedestal 71 of the assist grip.

The front extending part 27 and the rear extending part 25 each having the curved plate shape may also have a similar width in the left-right direction, i.e., in the inner-outer direction.

As described above, in the example embodiment, the curtain airbag 11 extending in the longitudinal direction in the stored state may be provided as the curtain airbag module 10 and attached to the vehicle body 2 of the vehicle 1. In the curtain airbag module 10, the second fixation tab 22 and the first fixation tab 24 to be attached to the vehicle body 2 while being overlaid on the respective vehicle-body fixation members 13 of the curtain airbag 11 may be coupled to each other by the coupler 23. In the example embodiment, for example, the coupler 23, and the second fixation tab 22 and the first fixation tab 24 coupled to each other by the coupler 23 may be permanently fixed to each other as a portion of the rear-end bracket 20 before being attached to the vehicle body 2. This helps to prevent the curtain airbag 11 that is in the stored state extending in the longitudinal direction at least along the side roof rail 4 of the vehicle body 2 from being easily twisted between the second fixation tab 22 and the first fixation tab 24 that are coupled to each other by the coupler 23.

However, even if the curtain airbag 11 is provided as the curtain airbag module 10 having the second fixation tab 22 and the first fixation tab 24, the curtain airbag 11 can be twisted in a case where the second fixation tab 22 and the first fixation tab 24 are not coupled to each other by the coupler 23. The curtain airbag 11 can be twisted between the second fixation tab 22 and the first fixation tab 24. Further, a person in charge can attach the curtain airbag module 10 to the vehicle body 2 without noticing the twisted state of the curtain airbag 11.

In the example embodiment, the second fixation tab 22 and the first fixation tab 24 may be coupled to each other by the coupler 23. This makes it possible to reduce the possibility that the curtain airbag module 10 is attached to the vehicle body 2 in the twisted state. In the example embodiment, it is possible to make easier the attachment, to the vehicle 1, of the curtain airbag module 10 including the curtain airbag 11 that extends in the longitudinal direction also in the stored state. This saves the person in charge checking that the curtain airbag 11 is not twisted every time the person in charge attaches the members including the vehicle-body fixation members 13 of the curtain airbag 11, the second fixation tab 22, the first fixation tab 24, and the free tab 26 to the vehicle body 2. This allows the person in charge to attach the curtain airbag module 10 to the vehicle 1 in a proper state without the curtain airbag 11 being twisted.

In one example, the coupler 23 of the example embodiment may not merely couple the second fixation tab 22 and the first fixation tab 24 that are adjacent to each other. The coupler 23 of the curtain airbag module 10 may be provided along the extending direction of the curtain airbag 11 extending in the longitudinal direction and may be fixed by the sealing tape 41 that is breakable upon the deployment of the curtain airbag 11. This allows the coupler 23 to serve as a guide that suppresses twisting of the curtain airbag 11. The coupler 23 may be able to suppress the twisting of the curtain airbag 11 itself in the curtain airbag module 10.

In addition, in the example embodiment, the coupler 23 that couples the second fixation tab 22 and the first fixation tab 24 that are adjacent to each other may not be present between the curtain airbag 11 and the vehicle body 2 in a state where the second fixation tab 22 and the first fixation tab 24 are attached to the vehicle body 2. This makes it possible to attach the curtain airbag 11 to the vehicle body 2 at a position substantially as close to the vehicle body 2 as that in a case where the coupler 23 does not couple the second fixation tab 22 and the first fixation tab 24 that are adjacent to each other. This prevents the side roof rail 4 from stretching out into the vehicle compartment 3.

For comparison, assume a case where, for example, the coupler 23 that couples the second fixation tab 22 and the first fixation tab 24 that are adjacent to each other is present between the curtain airbag 11 and the vehicle body 2 in a state where the second fixation tab 22 and the first fixation tab 24 are attached to the vehicle body 2. In this case, the curtain airbag 11 may be attached to the vehicle body 2 at a position shifted to the inner side of the vehicle body 2 and away from the vehicle body 2. A portion of the side roof rail 4 may stretch out into the vehicle compartment 3 more greatly in order to attach the curtain airbag 11 having the coupler 23 to the side roof rail 4. This can more easily give an oppressive feeling to the occupant in the vehicle compartment 3.

In the example embodiment, the coupler 23 may not be present between the curtain airbag 11 and the vehicle body 2. This helps to make it unnecessary to secure a space for the coupler 23 between the curtain airbag 11 and the vehicle body 2. This helps to prevent the side roof rail 4 from stretching out to the inner side of the vehicle body 2. Accordingly, it is possible to prevent the occupant in the vehicle compartment 3 from easily having the oppressive feeling due to a reduction in an upper space of the vehicle compartment 3.

In the example embodiment, the rear-end bracket 20 including the coupler 23, and the second fixation tab 22 and the first fixation tab 24 coupled to each other by the coupler 23 may further include the front extending part 27 and the rear extending part 25. The front extending part 27 and the rear extending part 25 may extend toward the front side from the first fixation tab 24 which is the first one positioned on the front side among the tabs. The rear-end bracket 20 extending along the curtain airbag 11 may be able to extend toward the front side without being limited to the range where the second fixation tab 22 and the first fixation tab 24 are provided. The extension toward the front side of the rear-end bracket 20 due to the front extending part 27 and the rear extending part 25 further helps to prevent the curtain airbag 11 from being twisted.

In the example embodiment, the rear-end bracket 20 may further include the free tab 26 so that the front extending part 27 and the rear extending part 25 are fixed to the vehicle body 2 along the curtain airbag 11. The free tab 26 may attach the front extending part 27 and the rear extending part 25 to the vehicle body 2 by itself. The free tab 26 may be configured to attach the front extending part 27 and the rear extending part 25 to the vehicle body 2 by itself without being attached to the vehicle body 2 while being overlaid on the vehicle-body fixation member 13 of the curtain airbag 11. This makes it possible to favorably fix the front extending part 27 and the rear extending part 25 themselves to the vehicle body 2, along the curtain airbag 11, in a state where the curtain airbag module 10 is attached to the vehicle body 2. The front extending part 27 and the rear extending part 25 may each extend in the longitudinal direction and be provided to the rear-end bracket 20. This helps to prevent the front extending part 27 and the rear extending part 25 extending in the longitudinal direction in the rear-end bracket 20 from moving, for example, while the vehicle 1 is traveling.

In the example embodiment, the coupler 23 may have the curved plate shape that is curved along the upper surface of the curtain airbag 11 in the stored state extending in the longitudinal direction. In addition, the coupler 23 having the curved plate shape may be coupled to the second fixation tab 22 and the first fixation tab 24 at the outer edge that is present on the outer side of the vehicle body 2, and may stand with respect to the contact surface 31 of the second fixation tab 22 and the first fixation tab 24. The contact surface 31 of the second fixation tab 22 and the first fixation tab 24 may be in contact with the vehicle body 2 where the second fixation tab 22 and the first fixation tab 24 are attached to the vehicle body 2.

This may also be applicable to the front extending part 27 and the rear extending part 25.

This allows the coupler 23, the front extending part 27, and the rear extending part 25 provided along the extending direction of the curtain airbag 11 extending in the longitudinal direction not to be present between the curtain airbag 11 and the vehicle body 2 in a state where the curtain airbag 11 is attached to the vehicle body 2. It is possible to attach the curtain airbag 11 at a position close to the vehicle body 2.

The coupler 23, the front extending part 27, and the rear extending part 25 may each have the curved plate shape. Accordingly, in a case where the stored curtain airbag 11 deploys and inflates, the coupler 23, the front extending part 27, and the rear extending part 25 may be pushed and deformed by the curtain airbag 11. The coupler 23, the front extending part 27, and the rear extending part 25 each having the curved plate shape may not hold back the curtain airbag 11. The coupler 23, the front extending part 27, and the rear extending part 25 each having the curved plate shape may be provided along the upper surface of the curtain airbag 11 in the stored state extending in the longitudinal direction but do not prevent the curtain airbag 11 from deploying.

Next, a description is further given of features of the fixation tabs provided to the rear-end bracket 20 of the example embodiment, taking the first fixation tab 24 for example.

Note that, for example, the second fixation tab 22 and the free tab 26 may each have a shape similar to the shape of the first fixation tab 24.

Figure 10:
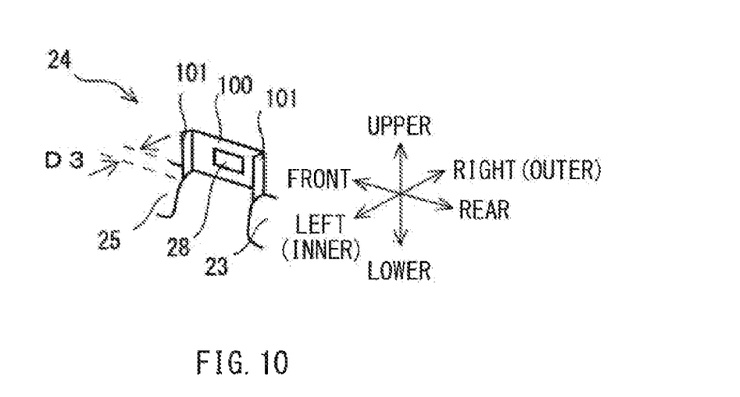
FIG. 10 is a diagram for describing a structure of a tab provided to the rear-end bracket of one example embodiment, taking the first fixation tab for example.

FIG. 10 is a diagram for describing a structure of the tab provided to the rear-end bracket 20 of the example embodiment, taking the first fixation tab 24 for example.

The first fixation tab 24 illustrated in FIG. 10 may include a plate 100 and a pair of ribs 101. The rear extending part 25 having the curved plate shape may be coupled to the first fixation tab 24 on the front side of the first fixation tab 24. The coupler 23 having the curved plate shape may be coupled to the first fixation tab 24 on the rear side of the first fixation tab 24.

In one example, the plate 100 may have a substantially rectangular plate shape. The plate 100 having the substantially rectangular shape may have a bracket hole 28 in the middle thereof. The bracket hole 28 may receive the clip 60 to be inserted therein. In one example, the plate 100 may have a size greater than an outer shape of the clip 60.

The pair of ribs 101 may be provided at a front edge and a rear edge of the plate 100 provided in the extending direction of the curtain airbag 11, and may extend along the upper-lower direction of the plate 100 having the substantially rectangular shape. The pair of ribs 101 may stand to protrude toward the inner side of the vehicle body 2 from the edges, provided in the front-rear direction, of the plate 100 having the substantially rectangular shape.

A protruding width D3 by which the ribs 101 protrude toward the inner side may be, for example, about the same as a thickness of the plate 100 having the substantially rectangular shape.

Providing the pair of ribs 101 with a small protruding width about the same as the thickness of the plate 100 makes it easier for the first fixation tab 24 to be bent.

The rear extending part 25 having the curved plate shape may be coupled at its outer edge to a lower end of the rib 101 positioned on the front side. The rear extending part 25 and the first fixation tab 24 may be coupled to each other substantially at a point within a range corresponding to the small lower-edge width of the rib 101.

In addition, the coupler 23 having the curved plate shape may be coupled at its outer edge to a lower end of the rib 101 positioned on the rear side. The coupler 23 and the first fixation tab 24 may be coupled to each other substantially at a point within a range corresponding to the small lower-edge width of the rib 101.

As illustrated in FIG. 7, the first fixation tab 24 having the small width may be fixed to the side roof rail 4 by the clip 60 while being overlaid on the vehicle-body fixation member 13 of the curtain airbag 11.

The first fixation tab 24 having the small width may be easily bent. Therefore, even if the curtain airbag 11 deploys and pushes upward the rear extending part 25 or the coupler 23, the plate 100 having the substantially rectangular shape may be prevented from easily moving away as a whole from the side roof rail 4.

For example, if the plate 100 having the substantially rectangular shape moves away as a whole from the side roof rail 4, the clip 60 may receive force in a direction pulling out the clip 60. When the force in the direction pulling out the clip 60 increases, the backward projection 63 of the clip 60 may be detached from the fixation hole 80 of the side roof rail 4, and the first fixation tab 24 may fall off from the side roof rail 4. If the clip 60 falls off from the vehicle body 2, thereafter, the curtain airbag 11 can deploy in a way that is different from a way in a case where the clip 60 has not fallen off from the vehicle body 2.

Figure 11:
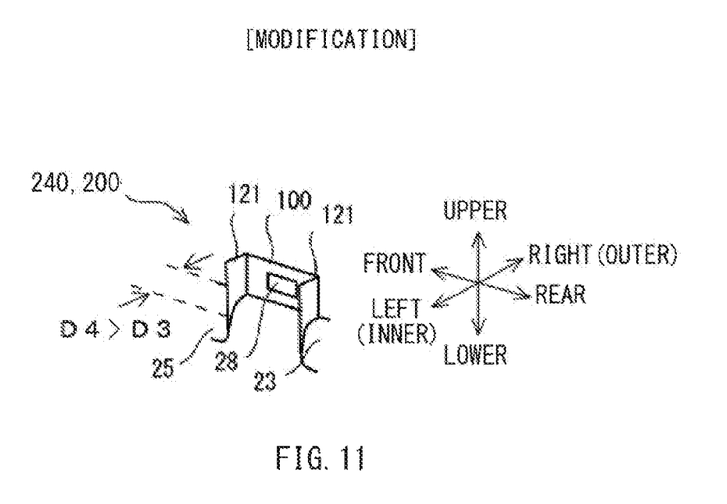
FIG. 11 is a diagram for describing a first fixation tab according to a modification which is to be compared with FIG. 10.

FIG. 11 is an explanatory diagram for describing a first fixation tab 240 according to a modification which is to be compared with FIG. 10.

Figure 12:
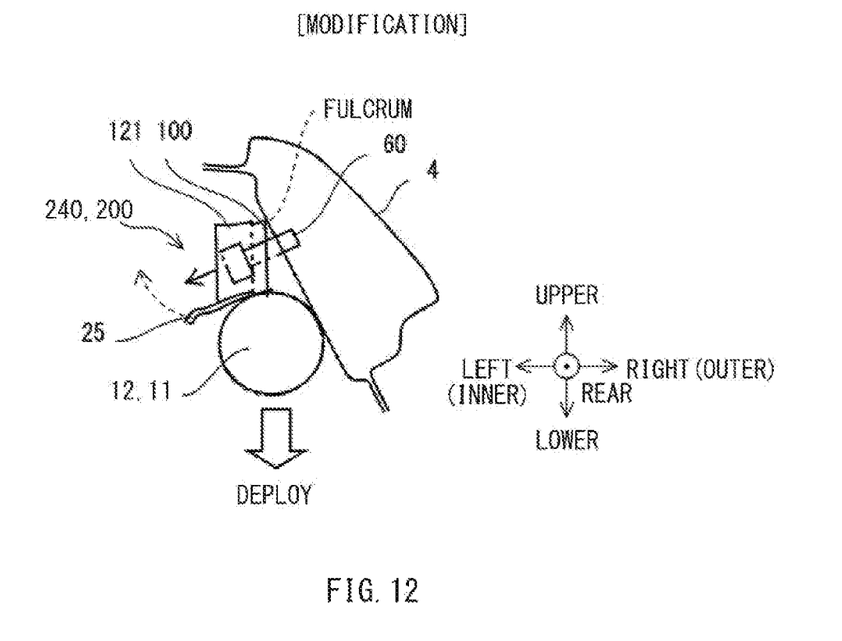
FIG. 12 is a diagram for describing a possible movement of the first fixation tab according to the modification illustrated in FIG. 11 upon the deployment of the curtain airbag.

FIG. 12 is a diagram for describing a possible movement of the first fixation tab 240 according to the modification illustrated in FIG. 11 upon the deployment of the curtain airbag 11.

As with the example embodiment, the first fixation tab 240 according to the modification illustrated in FIGS. 11 and 12 may include the plate 100 and a pair of ribs 121.

Note that the ribs 121 of the modification may have, for example, a large protruding width D4 that is about the same as the width in the inner-outer direction of the rear extending part 25 having the curved plate shape or the width in the inner-outer direction of the coupler 23 having the curved plate shape. The protruding width D4 may be greater than the protruding width D3.

The rear extending part 25 and the first fixation tab 240 of the modification may be coupled to each other substantially on a line along the width of the lower edge of the rib 121 having a great width.

The coupler 23 and the first fixation tab 240 of the modification may be coupled to each other substantially on a line along the width of the lower edge of the rib 121 having a great width.

Therefore, it is difficult for the first fixation tab 240 of the modification to be bent and deformed, as compared with the first fixation tab 24 of the example embodiment illustrated in FIG. 10.

Even if the curtain airbag 11 deploys and pushes upward the rear extending part 25 or the coupler 23, it is difficult for the first fixation tab 240 of the modification to be deformed.

As a result, when the force pushing upward the rear extending part 25 or the coupler 23 increases, the first fixation tab 240 of the modification as a whole may easily rotate away from the side roof rail 4 with an upper end of the first fixation tab 240 serving as a fulcrum.

If the first fixation tab 240 as a whole moves away from the side roof rail 4, the clip 60 may receive force pulling out the clip 60. This can cause the first fixation tab 240 of the modification to fall off from the side roof rail 4.

The first fixation tab 24 of the example embodiment itself may be easily bent because the ribs 101 have a small width. This helps to prevent the first fixation tab 24 as a whole from moving away from the vehicle body 2 with an upper end of the first fixation tab 24 serving as a fulcrum.

As described above, the first fixation tab 24 of the example embodiment may include the plate 100 having the substantially rectangular shape that has the bracket hole 28 and is to be fixed to the vehicle body 2 by the clip 60 while being overlaid on the vehicle-body fixation member 13 of the curtain airbag 11. In addition, the first fixation tab 24 may include the ribs 101 having a small width. Each of the ribs 101 may be provided along an edge, of the plate 100 having the substantially plate, provided in the extending direction of the curtain airbag 11 and protrude from the plate 100 having the plate shape toward the inner side of the vehicle body 2. The rear-end bracket 20 as a whole including the first fixation tab 24 may include the resin material and may therefore be flexible. The first fixation tab 24 may be coupled at the lower edge of the rib 101 to the outer edge of the coupler 23 having the curved plate shape substantially at a point. The rib 101 as a whole may have a small width in the upper-lower direction of the vehicle body 2 in a state where the curtain airbag module 10 is attached to the vehicle body 2.

Accordingly, in a case where the stored curtain airbag 11 deploys and inflates, the coupler 23 having the curved plate shape may be deformed in such a manner that the coupler 23 as a whole is pushed upward and moved by a pressure. It is possible to provide the coupler 23 having the curved plate shape along the upper surface of the curtain airbag 11 in the stored state extending in the longitudinal direction so that the coupler 23 does not prevent the curtain airbag 11 from deploying. The curtain airbag 11 is able to deploy in a manner similar to that in a case where the coupler 23 having the curved plate shape is not provided.

In addition, in the case where the stored curtain airbag 11 deploys and inflates, the plate 100 having the substantially rectangular plate shape that is fixed to the vehicle body 2 by the clip 60 while being overlaid on the vehicle-body fixation member 13 of the curtain airbag 11 may be prevented from receiving great force. Upon the deployment of the curtain airbag 11, the clip 60 fixing the plate 100 having the plate shape may be prevented from easily falling off from the vehicle body 2.

For comparison, assume a case where the ribs 101 have a great width, and the coupler 23 having the curved plate shape is coupled substantially on a line to a long lower edge of the ribs 101 having the great width. In this case, the force caused by the deployment and inflation of the curtain airbag 11 and pushing upward the coupler 23 having the curved plate shape may easily act on the plate 100 having the plate shape via the ribs 101 having the great width. The plate 100 having the plate shape may easily receive great force that twists the plate 100 upward. As a result, the clip 60 can be easily twisted and detached from the vehicle body 2 by the movement of the plate 100 having the plate shape that is twisted upward. If the clip 60 falls off from the vehicle body 2, thereafter, the curtain airbag 11 can deploy in a different manner.

For example, in the example embodiment, the rear-end bracket 20 as a whole including the first fixation tab 24 may include the flexible resin material. In addition, the first fixation tab 24 and the coupler 23 having the curved plate shape may be coupled to each other substantially at a point. Accordingly, in the example embodiment, even if the coupler 23 is pushed and moved upward, the movement is at least partially absorbable as a rotation movement of the coupler 23 around the substantially-point coupling portion of the first fixation tab 24 and the coupler 23 having the curved plate shape. The plate 100 having the plate shape may be prevented from easily receiving the force twisting the plate 100 upward.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Figure 13:
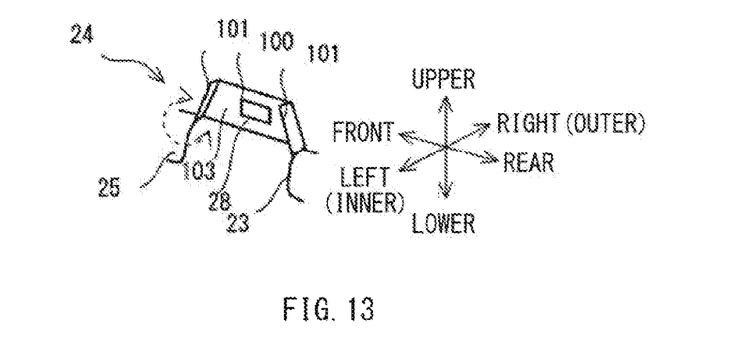
FIG. 13 is a diagram for describing a structure, according to a first modification, of the first fixation tab illustrated in FIG. 10.

FIG. 13 is an explanatory diagram for describing a structure, according to a first modification, of the first fixation tab 24 illustrated in FIG. 10.

The first fixation tab 24 according to the first modification illustrated in FIG. 13 may include the plate 100 having a substantially trapezoidal plate shape.

The pair of ribs 101 having a small width may extend along a pair of inclined edges of the plate 100 having the substantially trapezoidal plate shape. The inclined edges may be provided on the front side and on the rear side of the plate 100.

As described above, in the first fixation tab 24 according to the first modification, the plate 100 having the substantially trapezoidal plate shape may have an inclination where a lower portion of the edge along which the rib 101 is provided is greater in distance from the bracket hole 28 than an upper portion of the edge along which the rib 101 is provided. The lower portion and the upper position of the edge may be positioned in the upper-lower direction of the vehicle 1.

The rear extending part 25 having the curved plate shape may be coupled at its outer edge to the lower end of the rib 101 that has the small width and is provided on the front side. The rear extending part 25 and the first fixation tab 24 may be coupled to each other substantially at a point within a range having the width of the lower edge of the rib 101 having the small width.

The coupler 23 having the curved plate shape may be coupled at its outer edge to the lower end of the rib 101 that has the small width and is provided on the rear side. The coupler 23 and the first fixation tab 24 may be coupled to each other substantially at a point within a range having the width of the lower edge of the rib 101 having the small width.

As described above, in the first fixation tab 24 according to the first modification, the plate 100 may have the substantially trapezoidal plate shape. Accordingly, the curtain airbag 11 may so deploy and inflate as to push upward the coupler 23 or the rear extending part 25 having the curved plate shape. Even if such force is transmitted to the plate 100, the plate 100 having the substantially trapezoidal shape may be easily twisted in such a manner that the plate 100 rotates around base angles of the trapezoid serving as the coupling portion of the first fixation tab 24 and the coupler 23. This helps to prevent the first fixation tab 24 as a whole from moving away from the side roof rail 4 and to prevent the bracket hole 28 from being greatly deformed. The clip 60 can be easily twisted and detached from the vehicle body 2. If the clip 60 falls off from the vehicle body 2, thereafter, the curtain airbag 11 can deploy in a different manner.

In the first modification, the plate 100 having the substantially trapezoidal shape may be great in distance from a lower angle portion of the substantial trapezoid to the bracket hole 28. This may cause a portion of the plate 100 near a lower angle of the substantial trapezoid to be twisted easily in a rotating manner. It may be possible that the force pushing and moving upward the coupler 23 to be transmitted to the plate 100 of the first fixation tab 24 via the coupling portion at which the first fixation tab 24 and the coupler 23 are coupled to each other. However, even if such force acts on the plate 100, in the first modification, the lower angle portion of the plate 100 having the substantially trapezoidal shape may be partially twisted and deformed, which makes it possible to at least partially absorb the force. The clip 60 can be easily twisted and detached from the vehicle body 2.

As illustrated in FIG. 4, a front half of the plate 100 of the second fixation tab 22 of the example embodiment may have a shape corresponding to a trapezoid.

In one example, the plate 100 of the free tab 26 illustrated in FIG. 4 may have a shape provided in the first modification or a shape similar thereto.

Figure 14:
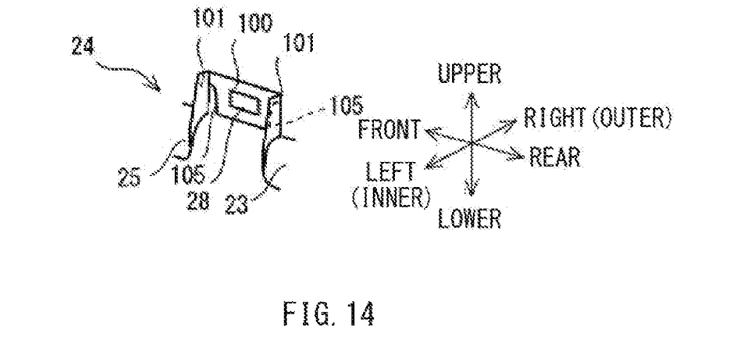
FIG. 14 is a diagram for describing a structure, according to a second modification, of the first fixation tab illustrated in FIG. 10.

FIG. 14 is an explanatory diagram for describing a structure, according to a second modification, of the first fixation tab 24 illustrated in FIG. 10.

The first fixation tab 24 according to the second modification illustrated in FIG. 14 may have a pair of slits 105. The pair of slits 105 may be provided at the edges, positioned in the front-rear direction, of the plate 100 having the substantially rectangular plate shape.

As a result, the rib 101 having the small width and provided on the front side may be coupled to the plate 100 having the substantially rectangular shape only at an upper portion of the first fixation tab 24 in the upper-lower direction of the vehicle 1. For example, the rib 101 having the small width and provided on the front side may be coupled to the plate 100 only in a range that is on the upper side of an upper edge of the bracket hole 28 provided in the middle of the plate 100.

In addition, the rib 101 having the small width and provided on the rear side may be coupled to the plate 100 having the substantially rectangular shape only at an upper portion of the first fixation tab 24 in the upper-lower direction of the vehicle 1. For example, the rib 101 having the small width and provided on the rear side may be coupled to the plate 100 only in a range that is on the upper side of the upper edge of the bracket hole 28 provided in the middle of the plate 100.

As described above, the ribs 101 having the small width and the plate 100 having the plate shape of the first fixation tab 24 according to the second modification may be coupled to each other only at the respective upper portions. In a case where the stored curtain airbag 11 deploys and inflates, the coupler 23 having the curved plate shape may be easily deformed in such a manner that the coupler 23 as a whole is pushed and moved upward by a pressure. It is possible to provide the coupler 23 having the curved plate shape at a position along the upper surface of the curtain airbag 11 in the stored state extending in the longitudinal direction, without preventing the deployment of the curtain airbag 11. The curtain airbag 11 is able to deploy in a manner similar to that in a case where the coupler 23 having the curved plate shape is not provided.

In addition, according to the second modification, in the case where the stored curtain airbag 11 deploys and inflates, the plate 100 having the substantially rectangular plate shape that is to be fixed to the vehicle body 2 by the clip 60 while being overlaid on the vehicle-body fixation member 13 of the curtain airbag 11 is prevented from receiving great force. Upon the deployment of the curtain airbag 11, the clip 60 fixing the plate 100 having the plate shape is prevented from easily falling off from the vehicle body 2.

For comparison, for example, assume a case where the ribs 101 and the plate 100 having the plate shape are coupled to each other in the entire range from the upper end to the lower end of the first fixation tab 24. In this case, due to the pushing up of the coupler 23 having the curved plate shape, the plate 100 having the plate shape can receive force that twists upward the plate 100 as a whole. As a result, due to the plate 100 having the plate shape that is twisted upward, the clip 60 can be easily twisted and detached from the vehicle body 2. If the clip 60 falls off from the vehicle body 2, thereafter, the curtain airbag 11 can deploy in a different manner.

For example, in the second modification, the rear-end bracket 20 as a whole including the first fixation tab 24 may include the flexible resin material. In addition, the ribs 101 and the plate 100 having the plate shape may be coupled to each other only at the upper portions of the first fixation tab 24. Accordingly, even if the force pushing and moving upward the coupler 23 is transmitted to the ribs 101 of the first fixation tab 24, only the ribs 101 of the first fixation tab 24 may be bent, which makes it possible to partially absorb the force.

Moreover, in the first fixation tab 24 according to the second modification, the ribs 101 and the plate 100 having the plate shape may be coupled to each other only at the upper portions of the first fixation tab 24 that is on the upper side of the bracket hole 28. Accordingly, even if the ribs 101 of the first fixation tab 24 are bent and twisted upward, the plate 100 having the plate shape may only receive force that pushes against the vehicle body 2 a portion on the upper side of the bracket hole 28. The plate 100 having the plate shape is prevented from easily receiving force that twists the plate 100 as a whole upward and away from the side roof rail 4.

The invention claimed is:

1. A curtain airbag module to be attached at least to a side roof member of a vehicle body of a vehicle, the curtain airbag module comprising:
    a curtain airbag comprising vehicle-body fixation points that are arranged in a longitudinal direction of the curtain airbag in a stored state extending in the longitudinal direction;
    first tabs to be attached to the vehicle body while being overlaid on a respective vehicle-body fixation point of the vehicle-body fixation points of the curtain airbag; and
    a coupler that couples some first tabs adjacent to each other, the some first tabs being a portion or all of the first tabs,
    wherein the coupler is provided along an extending direction of the curtain airbag extending in the longitudinal direction, and
    wherein, in a state where the first tabs are attached to the vehicle body, the coupler has a shape such that:
        an area between the curtain airbag and the vehicle body is devoid of the coupler; and
        in a direction of deployment of the curtain airbag, the coupler partially covers the curtain airbag.

2. The curtain airbag module according to claim 1, further comprising a bracket comprising the coupler and the some first tabs coupled to each other by the coupler,
    wherein the bracket further comprises a second tab that is to attach the coupler to the vehicle body without being overlaid on the vehicle-body fixation points of the curtain airbag.

3. The curtain airbag module according to claim 2, wherein the bracket comprises an extending part that extends to a front side from the second tab, the second tab being positioned most frontward among the some first tabs and the second tab provided on the bracket.

4. The curtain airbag module according to claim 3, wherein the coupler has a curved plate shape that is curved along an upper surface of the curtain airbag in the stored state extending in the longitudinal direction, and
    wherein the coupler is coupled to one or more of the first tabs at an outer edge of the curved plate shape and is to stand with respect to a contact surface of the one or more of the first tabs, the outer edge of the curved plate shape being present on a vehicle body side of the coupler, the contact surface of the one or more of the first tabs being in contact with the vehicle body where the one or more of the first tabs are attached to the vehicle body.

5. The curtain airbag module according to claim 3, wherein one or more of the some first tabs provided on the bracket comprises a flexible resin material,
    wherein the one or more of the some first tabs provided on the bracket each comprises:
        a plate having a plate shape, the plate having a clip hole, the plate being fixed to the vehicle body by a clip while being overlaid on one of the vehicle-body fixation points of the curtain airbag; and a rib provided along an edge of the plate having the plate shape, the edge of the plate being positioned along the extending direction of the curtain airbag,
wherein the rib has a small width, and
wherein the one or more of the some first tabs provided on the bracket are each coupled at a lower end of the rib having the small width to an outer edge of the coupler having a curved plate shape, the outer edge of the curved plate shape being present on a vehicle body side of the coupler.

6. The curtain airbag module according to claim 3, wherein one or more of the some first tabs provided on the bracket comprises a flexible resin material,
wherein the one or more of the some first tabs provided on the bracket each comprises:
a plate having a plate shape, the plate having a clip hole, the plate being fixed to the vehicle body by a clip while being overlaid on one of the vehicle-body fixation points of the curtain airbag; and
a rib provided along an edge of the plate having the plate shape, the edge of the plate being positioned along the extending direction of the curtain airbag,
wherein the edge of the plate having the plate shape has an inclination where a lower portion of the edge along which the rib is provided is greater in distance from the clip hole than an upper portion of the edge along which the rib is provided from the clip hole, the lower portion and the upper portion of the edge being positioned in an upper-lower direction of the vehicle, and
wherein the one or more of the some first tabs provided on the bracket are each coupled at a lower end of the rib to an outer edge of the coupler having a curved plate shape, the rib extending along the inclination, the outer edge of the curved plate shape being present on a vehicle body side of the coupler.

7. The curtain airbag module according to claim 3, wherein one or more of the some first tabs provided on the bracket comprises a flexible resin material,
wherein the one or more of the some first tabs provided on the bracket each comprises:
a plate having a plate shape, the plate having a clip hole, the plate being fixed to the vehicle body by a clip while being overlaid on one of the vehicle-body fixation points of the curtain airbag; and
a rib provided along an edge of the plate having the plate shape, the edge of the plate being positioned along the extending direction of the curtain airbag, and
wherein the one or more of the some first tabs provided on the bracket are each coupled at a lower end of the rib to an outer edge of the coupler having a curved plate shape, the outer edge of the curved plate shape being present on a vehicle body side of the coupler.

8. The curtain airbag module according to claim 2, wherein the coupler has a curved plate shape that is curved along an upper surface of the curtain airbag in the stored state extending in the longitudinal direction, and
wherein the coupler is coupled to one or more of the first tabs at an outer edge of the curved plate shape and is to stand with respect to a contact surface of the one or more of the first tabs, the outer edge of the curved plate shape being present on a vehicle body side of the coupler, the contact surface of the one or more of the first tabs being in contact with the vehicle body where the one or more of the first tabs are attached to the vehicle body.

9. The curtain airbag module according to claim 2, wherein one or more of the some first tabs provided on the bracket comprises a flexible resin material,
wherein the one or more of the some first tabs provided on the bracket each comprises:
a plate having a plate shape, the plate having a clip hole, the plate being fixed to the vehicle body by a clip while being overlaid on one of the vehicle-body fixation points of the curtain airbag; and
a rib provided along an edge of the plate having the plate shape, the edge of the plate being positioned along the extending direction of the curtain airbag,
wherein the rib has a small width, and
wherein the one or more of the some first tabs provided on the bracket are each coupled at a lower end of the rib having the small width to an outer edge of the coupler having a curved plate shape, the outer edge of the curved plate shape being present on a vehicle body side of the coupler.

10. The curtain airbag module according to claim 2, wherein one or more of the some first tabs provided on the bracket comprises a flexible resin material,
wherein the one or more of the some first tabs provided on the bracket each comprises:
a plate having a plate shape, the plate having a clip hole, the plate being fixed to the vehicle body by a clip while being overlaid on one of the vehicle-body fixation points of the curtain airbag; and
a rib provided along an edge of the plate having the plate shape, the edge of the plate being positioned along the extending direction of the curtain airbag,
wherein the edge of the plate having the plate shape has an inclination where a lower portion of the edge along which the rib is provided is greater in distance from the clip hole than an upper portion of the edge along which the rib is provided from the clip hole, the lower portion and the upper portion of the edge being positioned in an upper-lower direction of the vehicle, and
wherein the one or more of the some first tabs provided on the bracket are each coupled at a lower end of the rib to an outer edge of the coupler having a curved plate shape, the rib extending along the inclination, the outer edge of the curved plate shape being present on a vehicle body side of the coupler.

11. The curtain airbag module according to claim 2, wherein one or more of the some first tabs provided on the bracket comprises a flexible resin material,
wherein the one or more of the some first tabs provided on the bracket each comprises:
a plate having a plate shape, the plate having a clip hole, the plate being fixed to the vehicle body by a clip while being overlaid on one of the vehicle-body fixation points of the curtain airbag; and
a rib provided along an edge of the plate having the plate shape, the edge of the plate being positioned along the extending direction of the curtain airbag, and
wherein the one or more of the some first tabs provided on the bracket are each coupled at a lower end of the rib to an outer edge of the coupler having a curved plate shape, the outer edge of the curved plate shape being present on a vehicle body side of the coupler.

12. The curtain airbag module according to claim 2, wherein the curtain airbag is fixed to the coupler via a sealing tape.

13. The curtain airbag module according to claim 1, wherein the coupler has a curved plate shape that is curved along an upper surface of the curtain airbag in the stored state extending in the longitudinal direction, and wherein the coupler is coupled to one or more of the first tabs at an outer edge of the curved plate shape and is to stand with respect to a contact surface of the one or more of the first tabs, the outer edge of the curved plate shape being present on a vehicle body side of the coupler, the contact surface of the one or more of the first tabs being in contact with the vehicle body where the one or more of the first tabs are attached to the vehicle body.

14. The curtain airbag module according to claim 1, wherein the curtain airbag is fixed to the coupler via a sealing tape.

15. The curtain airbag module according to claim 1, further comprising a bracket that includes:
a base having a base tab;
a first fixation tab of the first tabs; a second fixation tab of the first tabs provided on an upper edge of the base;
the coupler;
and
a free tab.

16. The curtain airbag module according to claim 15, wherein the bracket is fixed to the vehicle body via the base tab and the second fixation tab of the first tabs such that the bracket does not change attitude with respect to the vehicle body upon deployment of the curtain airbag.

17. The curtain airbag module according to claim 15, wherein the base further includes a jump ramp having a shape protruding towards an inner side of the vehicle body such that the curtain airbag, when deployed, comes into contact with the jump ramp.

18. The curtain airbag module according to claim 15, wherein the coupler is provided on a front side of the second fixation tab of the first tabs.

19. The curtain airbag module according to claim 1, further comprising a bracket that includes:
a base having a base tab;
a first fixation tab of the first tabs; a second fixation tab of the first tabs provided on an upper edge of the base;
the coupler;
and
a free tab that is fixed to the vehicle body alone without being overlaid on the vehicle-body fixation points.

20. A curtain airbag module to be attached at least to a side roof member of a vehicle body of a vehicle, the curtain airbag module comprising:
a curtain airbag comprising vehicle-body fixation points that are arranged in a longitudinal direction of the curtain airbag in a stored state extending in the longitudinal direction;
first tabs to be attached to the vehicle body while being overlaid on a respective vehicle-body fixation point of the vehicle-body fixation points of the curtain airbag; and
a coupler that couples some first tabs adjacent to each other, the some first tabs being a portion or all of the first tabs,
wherein the coupler is provided along an extending direction of the curtain airbag extending in the longitudinal direction, and
wherein the coupler has a shape with no portion to be present between the curtain airbag and the vehicle body in a state where the first tabs are attached to the vehicle body;
further comprising a bracket comprising the coupler and the some first tabs coupled to each other by the coupler,
wherein the bracket further comprises a second tab that is to attach the coupler to the vehicle body without being overlaid on the vehicle-body fixation points of the curtain airbag, and
wherein the bracket comprises an extending part that extends to a front side from the second tab, the second tab being positioned most frontward among the some first tabs and the second tab provided on the bracket.

\* \* \* \* \*